United States Patent
Nitsch et al.

(10) Patent No.: US 11,645,848 B2
(45) Date of Patent: May 9, 2023

(54) METHOD AND DEVICE FOR CLASSIFYING OBJECTS

(71) Applicant: Ibeo Automotive Systems GmbH, Hamburg (DE)

(72) Inventors: Julia Nitsch, Hamburg (DE); Max Schmidt, Hamburg (DE)

(73) Assignee: Microvision, Inc., Redmond, WA (US)

( * ) Notice: Subject to any disclaimer, the term of this patent is extended or adjusted under 35 U.S.C. 154(b) by 8 days.

(21) Appl. No.: 17/181,096

(22) Filed: Feb. 22, 2021

(65) Prior Publication Data

US 2021/0174133 A1 Jun. 10, 2021

Related U.S. Application Data

(63) Continuation of application No. PCT/EP2019/073828, filed on Sep. 6, 2019.

(30) Foreign Application Priority Data

Sep. 7, 2018 (EP) .................................... 18193125
Sep. 14, 2018 (EP) .................................... 18194448

(51) Int. Cl.
| | |
|---|---|
| G06K 9/00 | (2022.01) |
| G06V 20/58 | (2022.01) |
| G06F 18/2413 | (2023.01) |
| G06F 18/21 | (2023.01) |
| G06F 18/25 | (2023.01) |
| G06V 10/80 | (2022.01) |
| G06V 10/82 | (2022.01) |
| G06V 10/44 | (2022.01) |

(52) U.S. Cl.
CPC ............ *G06V 20/58* (2022.01); *G06F 18/217* (2023.01); *G06F 18/2413* (2023.01); *G06F 18/253* (2023.01); *G06V 10/454* (2022.01); *G06V 10/806* (2022.01); *G06V 10/82* (2022.01)

(58) Field of Classification Search
CPC ...... G06K 9/627; G06K 9/6262; G06K 9/629; G06V 10/40; G06V 10/454; G06V 10/82; G06V 20/58; G06N 3/04; G06N 3/082
See application file for complete search history.

(56) References Cited

U.S. PATENT DOCUMENTS

| | | |
|---|---|---|
| 9,612,123 B1 | 4/2017 | Levinson et al. |
| 9,922,272 B2 * | 3/2018 | Cheng .................. G06K 9/6289 |
| 10,893,228 B2 * | 1/2021 | Averhart ................. G06F 16/51 |

(Continued)

OTHER PUBLICATIONS

Modality-Invariant Image Classification Based on Modality Uniqueness and Dictionary Learning Seungryong Kim, Student Member, IEEE, Rui Cai, Member, IEEE, Kihong Park, Student Member, IEEE, Sunok Kim, Student Member, IEEE, and Kwanghoon Sohn, Senior Member, IEEE. (Year: 2017).*

(Continued)

*Primary Examiner* — Dhaval V Patel

(57) ABSTRACT

A method for classifying objects which comprises a provision of measuring data from a sensor for a feature extraction unit as well as extraction of modality-independent features from the measuring data by means of the feature extraction unit, wherein the modality-independent features are independent of a sensor modality of the sensor, so that a conclusion to the sensor modality of the sensor is not possible from the modality-independent features.

11 Claims, 5 Drawing Sheets

(56) References Cited

U.S. PATENT DOCUMENTS

2014/0369561 A1* 12/2014 Gupta .................. G06V 20/53
                                                    382/103
2015/0220716 A1*  8/2015 Aronowitz ............ G06V 40/70
                                                    726/19

OTHER PUBLICATIONS

International Search Report issued by the International Search Authority for corresponding International Patent Application No. PCT/EP2019/073828, dated Nov. 4, 2019, with English translation attached.

Nitsch et al., "Object Classification Based on Unsupervised Learned Multi-Modal Features for Overcoming Sensor Failures", 2019 International Conference on Robotics and Automation (ICRA), IEEE, May 20, 2019, pp. 4369-4375, Infoscience EPFL scientific publications (/? In=en).

Ngiam et al. "Multimodal Deep Learning", International Conference on Machine Learning (ICML), Jun. 28, 2011, pp. 1-8, Retrieved Mar. 7, 2019 from the Internet: https://people.csail.mit.edu/khosla/papers/icml2011_ngiam.pdf.

Liu et al, "Learn to Combine Modalities in Multimodal Deep Learning", May 29, 2018, pp. 1-15, arXiv:1805.11730v1 [stat.ML].

* cited by examiner

METHOD AND DEVICE FOR CLASSIFYING OBJECTS

CROSS REFERENCE TO RELATED APPLICATIONS

This application is a continuation of International Application No. PCT/EP2019/073828, filed on Sep. 6, 2019, which takes priority from European Patent Application No. 18193125.4, filed on Sep. 7, 2018, and European Patent Application No. 18194448.9, filed on Sep. 14, 2018, the contents of each of which are incorporated by reference herein.

FIELD OF THE INVENTION

The disclosure relates to a method as well as a device for classifying objects.

BACKGROUND

For the use in the driverless navigation of vehicles, it is essential to know, which types of road users surround the vehicle, as well as which types of infrastructures are located in the surrounding area. In other words, it is essential to classify objects. It is known from the prior art to use measuring data of different sensor modalities for the object classification or object detection. This is advantageous in particular because the measuring data of the different sensor modalities can partially supply complementary information relating to the surrounding area. The data from the individual sensors are thereby typically processed separately and are subsequently also classified separately. Only subsequently can the data be merged again and processed further.

According to the prior art, the data extracted from the measuring data is further modality-dependent, so that it is necessary that a separate classification module is available and thus also has to be trained for each sensor modality. This is associated with extreme effort in particular when this does not involve image data, because the annotating of lidar or radar data sets for training classification modules is very time-consuming and error-prone. The reason for this is that the measured data is difficult to understand for humans, and persons annotating corresponding data sets have to be trained in a time-consuming manner, before they can begin with the task. Moreover, with respect to lidar and radar, the available annotated data sets are much smaller compared to image data sets.

The solution is based on the objective to improve a method as well as a device for classifying objects in such a way that, compared to the prior art, a classification unit for classifying the features does not need to be trained separately for the measuring data of different sensor modalities, but can be trained once based on measuring data of a single sensor modality.

The above-mentioned objective is solved by means of the method for classifying objects according to the disclosure. The method comprises the provision of measuring data from a sensor for a feature extraction unit. The method further comprises the extracting of modality-independent features, in particular by means of the feature extraction unit, from the measuring data. The modality-independent features are independent of a sensor modality of the sensor, so that a conclusion to the sensor modality is not possible from the modality-independent features. The method can further also comprise the extracting of modality-dependent features.

The term "Sensormodalität" is in particular the German term for the English term "sensor modality". In other words, the sensor modality is a sensor category or a sensor type. Sensors thus differ in particular in the sensor modality, that is, the sensor type or the sensor category. The sensor modality in particular determines the measuring method by means of which the measuring data is generated. The sensor modality is preferably lidar, radar, image, or ultrasound. This preferably means that the corresponding sensor of the modality is a lidar sensor, a radar sensor, an image sensor, in particular a camera, or an ultrasonic sensor.

The term "features" in particular refers to characteristic properties from the measuring data. They are in particular so-called "features", which are typically dependent on the sensor modality of the sensor, which has acquired the measuring data. Modality-independent features, however, are independent of the sensor modality of the sensor, which has acquired the measuring data. In other words, modality-independent features can be detected in the measuring data of at least two sensor modalities of the same object. They can thus also be referred to as common features. They are general, in other words, sensor-independent features. A conclusion to the sensor modality of the sensor is not possible based on modality-independent features. The modality-independent features are in particular independent of the type of the measuring method, from which the measuring data results.

In other words, the method is able to extract modality-independent features from the measuring data, which is independent of the sensor modality of the sensor. A classification unit for classifying the features thus does no longer need to be provided and trained separately for each sensor modality. It is sufficient to provide a single classification unit for all measuring data of different sensor modalities.

There is preferably at least a first and a second sensor modality, wherein the method is configured to extract modality-independent features from measuring data from a sensor of the first sensor modality in such a way that measuring data from a sensor of the second measuring modality can be reconstructed. The method is preferably configured to extract modality-independent features from measuring data of the second sensor modality, namely in such a way that measuring data of the first modality can be reconstructed. There are in particular more than two sensor modalities, especially three or four, wherein the method extracts modality-independent features in such a way that measuring data of each sensor modality can be reconstructed from these features.

Reconstructable means that when providing one decoder for each sensor modality, thus one decoder for the first sensor modality and one decoder for the second measuring modality, they would be able to generate measuring data of the corresponding modality from the modality-independent features. The first sensor modality is, for example, lidar, while the second modality is image. The feature extraction unit can extract modality-independent features from the lidar measuring data. An image, that is, measuring data of the second sensor modality, can thereby be reconstructed from these modality-independent features, even though the modality-independent features originate only from lidar measuring data.

The sensor modality preferably determines the type of the measuring data, wherein the type of the measuring data is radar measuring data, lidar measuring data, image data, or ultrasonic measuring data.

The measuring data can in particular be point clouds and/or image data. The point clouds are in particular unsorted point clouds. The method is preferably configured to extract modality-independent features from point clouds and/or image data in such a way that measuring data of the respective other measuring modality can be reconstructed. The feature extraction unit is in particular configured to extract modality-independent features from a point cloud and/or image data, so that measuring data of the respective other sensor modality, that is, an image and/or a point cloud, can be reconstructed from modality-independent features.

The sensor in particular has a first sensor modality, wherein this preferably means that the sensor corresponds to a certain sensor modality. A sensor can preferably have only a single sensor modality.

The method comprises in particular the generation of the measuring data, in particular of measuring data for classification purposes, which is subsequently passed on to the feature extraction unit. The measuring data is in particular lidar measuring data, so that the sensor of the first sensor modality is a lidar sensor. To generate measuring data, the method comprises in particular the transmission of a plurality of measuring pulses, in particular for generating lidar measuring data. The measuring data of different sensor modalities originates especially from the same scene.

A measuring pulse is in particular an optical, in particular electromagnetic signal. The measuring pulse preferably has a wavelength, which does not originate from the range, which is visible to the human eye. For safety reasons, invisible infrared is preferably used. A measuring pulse preferably has a pulse width, so that the measuring pulse can be understood as a time-limited portion of electromagnetic radiation. Due to the fact that the measuring pulse is an electromagnetic signal, and the speed of the measuring pulse is thus known, a conclusion can be drawn by means of the speed of light from the time-of-flight of a measuring pulse, as to which distance the measuring pulse has covered within the time-of-flight.

The method in particular comprises the performance of a plurality of scans. This means that measuring pulses or a sequence of measuring pulses are transmitted sequentially under different directions. The method is in particular a scanning lidar method. After transmitting the measuring pulses into a range, which is to be measured, a respective scan is concluded and a new scan can begin. After each concluded scan, modality-independent features are in particular extracted from the measuring data by means of the feature extraction unit, in order to classify objects.

The method in particular comprises the generation of measuring data from a sensor of a second sensor modality, wherein the method comprises the provision of the measuring data for the feature extraction unit. The second sensor modality and the first sensor modality preferably differ. In other words, the method preferably comprises the generation of measuring data from a sensor of a second sensor modality as well as of measuring data from a sensor of a first sensor modality, wherein the method comprises the provision of the measuring data of both sensor modalities for the feature extraction unit. The method can further comprise the generation of measuring data from a sensor of a third sensor modality, which is likewise provided for the feature extraction unit. The third sensor modality, the second sensor modality, and the first sensor modality preferably differ. The method can further comprise the generation of measuring data from a sensor of a fourth sensor modality, which is likewise provided for the feature extraction unit. The first sensor modality and/or the second sensor modality and/or the third sensor modality and/or the fourth sensor modality can be lidar, radar, image, or ultrasound. The sensor modalities differ in particular.

The method thus comprises in particular the generation of measuring data of different sensor modalities and a modality-independent feature extraction, so that an advantage is taken from being able to fall back on other sensor data for training the classification unit.

The feature extraction unit preferably comprises at least one feature extractor for each sensor modality, wherein the feature extractor extracts features from the measuring data. The feature extraction unit in each case in particular comprises one feature extractor for each sensor modality of the sensor, which generate measuring data. The feature extraction unit in particular comprises a feature extractor for the first sensor modality, that is preferably for lidar measuring data, wherein the feature extractor is configured to extract lidar features from the lidar measuring data. The features extracted by the feature extractors thereby include features, which can only be seen in the measuring data of one sensor modality, in other words modality-dependent features, as well as features, which can be seen in several sensor modalities, in other words modality-independent features. However, the feature extractors cannot differentiate these features from one another. In other words, the feature extractor does not know, which features are modality-dependent and which features are modality-independent.

The feature extraction unit more preferably comprises a respective corresponding feature extractor for the second sensor modality and/or the third sensor modality and/or the fourth sensor modality, which is configured to extract features from corresponding measuring data, for example corresponding radar features from radar measuring data, or corresponding image features from image data.

The feature extractor is in particular an "encoder", preferably a lidar encoder, radar encoder, image encoder, or ultrasonic encoder, depending on the sensor modality. The encoder can preferably be a point-cloud encoder, in particular when the measuring data is lidar measuring data.

The feature extractors in each case comprise in particular a neural network. The feature extractors are in particular neural networks. Preferably a neural network is used for each sensor modality, which optimally extracts the features, which can be detected therein.

Further preferably the feature extractor comprises for the second sensor modality, i.e. preferably for image data, a convolutional neural network (CNN), which comprises at least one convolutional layer. Each layer contains a plurality of artificial neurons.

Each layer of the CNN can be configured as convolutional layer. A convolutional layer in particular performs a convolution. The CNN in particular comprises at least 5, preferably at least 10, in particular at least 15, layers.

All layers (except for the last layer) are in each case activated especially by a non-linear function, in particular a so-called ReLU function. A ReLU function is thereby a "Rectified Linear Unit". In other words, it is a function, which is linear in the positive x-value range, but which is zero in the negative x-value range, wherein x represents an input value of a neuron. The last layer preferably does not have an activation function in order to permit all numerical values as last step.

The CNN is able to process input in the form of an image, in particular of a matrix. In the last layers, the CNN extracts simple features, such as, for example, straight lines, and the deeper the network becomes, the more complex the features become, which are extracted (e.g. L features, circle features, star features, high-dimensional features). Output of the network are thus features, in particular in the form of vectors. The output is also referred to as image code. This image code will also be referred to below as 'real image code', in order to differentiate it from a regenerated image code of a feature retransformation unit.

The feature extractor for the first sensor modality, i.e. preferably for lidar measuring data, in particular comprises a "multi layer perceptron" (MLP) network, which comprises at least one "multi layer perceptron" as layer (MLP layer). Each layer contains a plurality of artificial neurons. The MLP network in particular comprises a plurality of MLP layers. All of the MLP layers are preferably in each case activated by means of a non-linear function, in particular a so-called ReLU function. The MLP preferably has at least 3, in particular at least 5, layers, which can comprise several sublayers.

The MLP network can further comprise at least one fully connected layer, which can also be activated by a non-linear function, in particular a so-called ReLU function.

The MLP network is able to process input in the form of point clouds. Output of the network are thus features, in particular in the form of vectors. The output is also referred to as point cloud code. This point cloud code will also be referred to below as 'real point cloud code', in order to differentiate it from a regenerated point cloud code of a feature retransformation unit.

Further preferably the feature extraction unit comprises a feature transformation unit, which extracts modality-independent features from the features of at least two feature extractors. The term "transforming" is to be understood in particular as a finding of modality-independent features, wherein the latter are stored in a common feature space. In other words, the features are found and are displayed in a common space. In other words, the feature transformation unit is to thus be understood to be a unit for finding modality-independent features. All of the features, which the feature extractors extract, are in particular provided for the feature transformation unit, wherein the feature transformation unit extracts modality-independent features therefrom.

The advantage is that based on the modality-independent features, a conclusion can no longer be drawn to the sensor modality of the sensor, from which the features originate. As a result of the extraction and transformation, the feature extraction unit in particular issues a feature vector, which is modality-independent. The feature extraction unit especially provides feature vectors for the classification unit for classification purposes.

The feature transformation unit comprises especially one neural network for each sensor modality. The networks serve the purpose of finding the modality-independent features and optionally modality-dependent features, and of storing in a common feature space. The feature transformation unit is configured to process features, in particular feature vectors, which originate from the feature extractors, as input.

Each neural network of the feature transformation unit in particular comprises at least one fully connected layer. Preferably, the network comprises at least 2, preferably at least 3, fully connected layers. The fully connected layers are preferably in each case activated by means of a non-linear function, in particular a so-called ReLU function. The network can further comprise at least one dropout layer. The network is in particular set up in such a way that one dropout layer is arranged between two fully connected layers. The network comprises especially 5 layers. The last layer can thereby have no activation. All neural networks of the different sensor modalities of the feature transformation unit are in particular set up identically.

Output of the networks of the feature transformation unit are modality-independent features, in particular in the form of vectors. The feature transformation unit could further additionally also issue modality-dependent features. In other words, the feature transformation unit looks for features, which can be detected in all measuring data of the different sensor modalities, i.e. which have all sensor modalities in common. These modality-independent features are issued. However, the features, which only appear in one sensor modality, i.e. the modality-dependent features, could additionally also be issued.

The neural network of the first sensor modality issues in particular modality-independent, i.e. common features, and optionally lidar-specific features. The neural network of the second sensor modality issues in particular modality-independent, i.e. common features, and optionally image-specific features. Common features are features, which are included in the lidar measuring data and image data of the same scene.

The output is also referred to as feature code. If the network also issues modality-dependent features, it can in particular be specified to the network, at which location, in other words, at which indices of its output, the modality-dependent and modality-independent features are to be arranged. The output can thus be split.

A concrete example would be a striped wall, of which lidar measuring data and image data are available. The stripes cannot be detected in the lidar measuring data, whereas they can be detected in the image data. The situation is reversed for the depth information of the wall. The latter can be derived from the lidar measuring data, but not from the image data. The stripes would thus be an image-specific feature, while the depth information is a lidar-specific feature. The contour of the wall, which can be detected in the image data as well as in the lidar measuring data, would be a common feature.

The extracted features of the at least one feature extractor are preferably a vector, a so-called feature vector. The respective feature extractors in particular extract the features, especially in the form of vectors, but in each case in separate spaces, depending on the sensor modality. In other words, the features from the different sensor modalities live in separate spaces.

The feature transformation unit can be configured to transform features of the separate spaces into a common space, the so-called feature space. The feature space is in particular a vector space, preferably a metric space.

All features from the different sensor modalities, in other words the output of all feature extractors, are supplied in particular to the feature transformation unit. The latter transforms the features in such a way that a first portion of the features live in a common feature space. This space displays the features, which have both modalities in common. These features, which have both modalities in common, are the modality-independent features, in other words common features.

Further, other portions of the features can live in different, in other words modality-dependent or modality-specific feature spaces, respectively. A second portion lives, for example, in a feature space, which is assigned to the first sensor modality, and a third portion lives in a feature space, which is assigned to the second sensor modality. The same can apply for a third and fourth sensor modality. These special spaces each include features, which are only seen in one specific modality.

Preferably, the method can comprise the previous training of the feature extraction unit, in particular of the feature transformation unit and/or of the respective feature extractors. The term "previous" is to more preferably mean that the training is carried out prior to the generation of measuring data for classifying purposes. For this purpose, at least one data set is provided especially to the feature extraction unit for learning purposes. The unmonitored learning is carried out in particular based on at least one unannotated data set. The feature transformation unit, preferably the feature transformation unit and/or the respective feature extractors, is in particular trained by means of unmonitored learning, in order to learn modality-independent features.

The feature extraction unit, in particular the feature transformation unit and/or the respective feature extractors can in particular be trained. The feature transformation unit can further be trained by means of in-depth learning, so-called deep learning.

The feature transformation unit and/or the respective feature extractors are trained in particular by means of unmonitored learning. The respective neural network, which is trained, thereby comprises weights, which are specified by means of the learning.

Preferably, the feature extractors are trained first. The feature extractors, which are referred to as encoders, are preferably trained together with the corresponding decoders. This is advantageous, because they represent the outer layer of the different units. The encoder and decoder of each sensor modality is thereby learned separately from the other sensor modalities, so that they can be learned on different data sets. There is thus in particular no dependency on extensively generated data sets, which comprise measuring data of several sensor modalities.

The training of the feature extractors comprises the provision of an input. The input is in particular sensor modality-specific. In other words, the input for the feature extractor for the first sensor modality is lidar measuring data, in other words, point clouds, while the input for the second sensor modality is image data.

The input is preferably inserted into the feature extractor, which issues features as output. The feature extractor for the first sensor modality issues a point cloud code, while the feature extractor for the second sensor modality issues an image code. This 'real' code is inserted directly into the respective decoder, which generates sensor modality-dependent output therefrom again. In other words, the decoder for the first sensor modality generates a point cloud again, while the decoder for the second sensor modality generates an image again, in particular a gray scale value image.

This sensor modality-specific output of the decoders is compared to the respective sensor modality-specific input, which was inserted into the respective encoder. It is set as condition that the output of the decoder is to be identical to the input, which was given to the encoder. The weights of the corresponding neural networks are specified on the basis of this condition, so that the similarity is as high as possible.

Preferably, the decoder for the second sensor modality issues gray scale values of the "regenerated" image, which are compared to the gray scale values of the original input image. If it is a color image as input, a gray scale value image of the input can be generated by simple summation of the R,G,B values of each pixel and subsequent division by 3. For comparison purposes, a loss function is especially used, which compares the "mean squared error" of the gray scale values of the generated gray scale value image of the decoder and of the gray scale values of the real gray scale value image of the input. The loss is to equal zero.

Preferably, the decoder for the first sensor modality issues a "regenerated" point cloud, which is compared to the point cloud, which was provided to the feature extractor. For comparison purposes, the Chamfer distance between the point clouds is preferably determined. The distance to the nearest point of the other point cloud is thereby preferably determined for each point of the one point cloud. The same is carried out analogously for each point of the other point cloud. The distances are added up. The sum of all distances is the Chamfer distance. The more similar the point clouds are, the smaller it is. A loss function is especially used, which compares the Chamfer distance between the generated point cloud of the decoder and the original point cloud. The loss is to equal zero.

The feature transformation unit can be trained as second step. Preferably, the feature transformation unit is trained together with a feature retransformation unit. The feature retransformation unit preferably likewise has a neural network for each sensor modality. For training purposes, the corresponding encoders and decoders of the different sensor modalities are thereby also used, wherein the weights thereof are specified, however, because the training thereof has already been concluded at that point in time.

The neural network of the feature retransformation unit has at least one fully connected layer. The neural network has in particular two subunits, one unit, in which the modality-dependent features are processed, and one unit, in which the modality-independent features can be processed.

Preferably, the network comprises at least 2, preferably at least 3, fully connected layers. The fully connected layers are preferably each activated by means of a non-linear function, in particular a so-called ReLU function. The network can further comprise at least one dropout layer. The network is in particular set up in such a way that one dropout layer is arranged between two fully connected layers. The last layer has no activation.

To train the feature transformation unit, sensor modality-dependent, i.e. modality-specific input of the same scene is in each case provided to the feature extractor. In other words, the input for the feature extractor for the first sensor modality is lidar measuring data, in other words, point clouds, while the input for the second sensor modality is image data.

The input is preferably inserted into the feature extractor, which issues features as output. The feature extractor for the first sensor modality issues a point cloud code, while the feature extractor for the second sensor modality issues an image code. This code is now inserted into the corresponding neural network of the feature transformation unit, which extracts modality-independent features and optionally modality-dependent features therefrom.

The output of the neural networks is inserted into the corresponding neural network of the feature retransformation unit, which generates sensor modality-dependent code from the features again. In other words, the neural network of the feature retransformation unit for the first sensor modality generates a point cloud code again, while the neural network of the feature retransformation for the second sensor modality generates an image code again.

It is set as main condition that the common features of the different networks or of the different modalities, respectively, are identical. For this purpose, the common features, which the neural network of the feature transformation unit for the first sensor modality has generated, and the common features, which the neural network for the second sensor modality has generated, are compared. The cosine similarity of the same feature, which can be detected in both modalities, is to in particular equal zero. This serves the purpose of finding the common features.

The code of the respective neural networks of the feature retransformation unit is further compared to the 'real' code of the corresponding feature extractor, i.e. the output of the feature extractor. It is set as secondary condition in a first step that the forward transformation and reverse transformation is to receive the same code, i.e. the same features. In other words, it is specified as secondary condition that the mean squared error is to equal zero. This in particular serves the purpose of learning the initial weights of the neural to the feature transformation unit.

Preferably, a loss function is used, which has the following conditions at the first, preferably at least 100, maximally 300, most preferably 200, epochs:

cosine similarity of the common features of both modalities mean squared error between 'real image code' of the feature extractor and the retransformed image code of the feature retransformation unit mean squared error between 'real point cloud code' of the feature extractor and retransformed point cloud code of the feature retransformation unit The common loss of the above-mentioned conditions is determined, which is to equal zero, and is optimized by adaptation of the weights.

In a second step, the output of the neural networks of the feature retransformation unit is inserted into the respective decoder, and the output of the decoders is then compared to the input, which was inserted into the feature extractors. The main condition then no longer refers to the identity of the features or of the codes, respectively, but to the identity of the original modality-dependent input of the feature extractors and of the output of the decoders.

Preferably, the decoder for the second sensor modality issues gray scale values of the "regenerated" image, which are compared to the gray scale values of the original input image. For comparison purposes, the "mean squared error" of the gray scale values of the generated gray scale value image of the decoder and of the gray scale values of the real gray scale value image of the input are compared.

Preferably, the decoder for the first sensor modality issues a "regenerated" point cloud, which is compared to the point cloud. For comparison purposes, the Chamfer distance is preferably determined.

The following conditions are set on the last, preferably at least 100, maximally 300, most preferably 200, epochs:

cosine similarity of the common features of both modalities mean squared error between 'real image data' and generated image data Chamfer distance between 'real point cloud' and generated point cloud The common loss of the above-mentioned conditions is determined and is optimized by adaptation of the weights.

The method in particular comprises the classification of the modality-independent features, in particular of the feature vectors received from the feature extraction unit, by means of a classification unit. The method in particular uses a single classification unit for classifying all features of the sensors of all sensor modalities, from which measuring data is generated and provided. The method in particular does not comprise the use of a separate classification unit for each sensor modality.

The method can further comprise the previous training of the classification unit by means of monitored learning. For this purpose, at least one data set for learning is especially provided to the classification unit. The classification unit is in particular trained based on annotated image data. The term "previous" is to more preferably mean that the training is performed prior to the generation of measuring data for classification purposes. The classification unit is trained in particular by means of monitored learning, in order to classify modality-independent features.

The training of the classification unit based on annotated image data sets is particularly advantageous in particular because annotated image data sets currently account for the largest amount of annotated data. Due to the fact that the feature extraction unit is configured to extract modality-independent features, which are independent of a sensor modality, a single classification unit can be used, which is trained based on data sets of a single sensor modality. Even though the classification unit was preferably trained using annotated image data sets, it is likewise able, based on the modality-independence of the extracted features, to classify features from lidar measuring data, even though it was never trained using lidar measuring data. This represents a significant advantage of the present method as compared to the prior art.

The method comprises especially the transfer of at least one feature vector from the feature extraction unit to the classification unit. This feature vector can include only the modality-independent features or additionally also modality-dependent features. The classification comprises the comparison of the received feature vector with a respective previously specified average feature vector for each class, wherein a corresponding class label is issued when falling below a previously specified deviation limit.

The training of the classification unit can especially comprise the determination of classes. The classification unit in particular determines the classes, for which it is to assign so-called class labels after the training has been concluded, based on the at least one data set, which was provided to the classification unit for training purposes. One class can relate, for example, to cars, while a further class relates to pedestrians.

The at least one data set for training purposes preferably comprises a plurality of feature vectors, wherein a plurality of feature vectors can be assigned to each class. The training can further comprise the determination of an average feature vector for each class. The average feature vector of a class is determined especially by means of averaging the feature vectors of this class. The method comprises the storing of the average feature vectors.

The method can in particular comprise the transfer of at least one feature vector from the feature extraction unit to the classification unit, which is to be classified by means of the classification unit. First of all, a processing of the feature vector takes place in particular by means of the classification unit. As a result, a processed feature vector, especially a bottle neck vector, is received. The processing especially serves the purpose that clearer separating lines can be detected between different classes.

The classification unit in particular comprises a neural network, wherein the latter preferably comprises at least 3, preferably at least 4, in particular 5, layers. The neural network in particular comprises at least one fully connected layer. Preferably, the network comprises at least 2, preferably at least 3, fully connected layers. The fully connected layers are preferably in each case activated by means of a non-linear function, in particular a so-called ReLU function.

The network comprises especially 5 layers. The last layer thereby has no activation. The last layer is referred to as bottle neck vector.

The neural network of the classification unit serves for the processing of the feature vectors. As a result, a bottle neck vector is preferably received.

The classification unit can further comprise a decision module, wherein the latter performs a comparison between the received feature vector and the average feature vectors. The average feature vectors are in particular also average bottle neck vectors. The revised feature vectors are in particular compared to the average feature vectors. The average feature vectors thereby represent the certain trained knowledge of the classification unit.

For comparison purposes, the cosine similarity between the received feature vector, preferably of the processed feature vector, and the average feature vectors, is especially determined in each case. Deviation limits, so-called thresholds, are in particular specified beforehand. This serves the purpose of specifying, at which similarity a certain class is to be detected or starting at which deviation a class label is to no longer be assigned for this class, respectively. When falling below the deviation limit to an average feature vector, a corresponding class label is issued. In other words, in the case of sufficient similarity to the average feature vector of a class, the classification module detects an object of this class and issues the corresponding class label.

When exceeding all of the previously specified deviation limits from the average feature vectors, the decision module can issue as a result that no object of the classes was detected. In particular, no class label is issued. The comparison as well as the issuance is carried out especially by means of a decision module of the classification unit. The decision module thus decides whether a class label is to be issued in response to a deviation from the certain knowledge of the classification unit.

The solution further comprises a method for the optical distance measurement comprising an above-described method for classifying objects.

An optical distance measurement is in particular characterized in that, by using optical signals, here optical measuring pulses, distances are determined. The term "distance" is to be understood as a range. The distance covered by the measuring pulse is to be understood as the route between a device for carrying out the method, which has transmitted the measuring pulse, and the object, which has reflected it, plus the route between the object and the device, which has received the corresponding reflected measuring pulse. The reflected measuring pulses in each case represent backscattering signals of the sent-out measuring pulses. In other words, the measuring pulses reflected at an object are measuring pulses, which were transmitted beforehand by means of the transmission unit. The optical distance measurement is preferably based on the time-of-flight principle.

The method for classifying of objects and/or the method for measuring distances serves in particular for navigating a driverless vehicle.

In a further aspect, the solution comprises a device for classifying objects, which is configured to carry out an above-described method for classifying objects.

The device comprises in particular a transmission unit and a receiving unit. In particular, the receiving unit in each case comprises at least one sensor for each sensor modality, wherein the transmission unit can in each case have the corresponding transmission modules for generating the measuring data for transmitting the signals for generating the measuring data of the respective sensor modality.

The device in particular comprises a sensor of a first sensor modality, preferably a sensor of a second sensor modality, and/or a sensor of a third sensor modality, and/or a sensor of a fourth sensor modality. The device is thus in particular configured to generate measuring data of at least two sensor modalities, preferably three or four sensor modalities.

The device is in particular a scanning lidar sensor, wherein the latter can preferably comprise further sensors of other sensor modalities. The device can especially further be configured to carry out an above-described method for distance measurement.

The device further comprises a feature extraction unit, which, in turn, has one feature extractor for each sensor modality of the used sensors. The feature extraction unit further comprises a feature transformation unit for extracting modality-independent features and optionally modality-dependent features from the extracted features of the feature extractors. The feature transformation unit is in particular trained by means of unmonitored learning, wherein the classification unit is more preferably rained, in particular by means of monitored learning.

The device serves in particular for navigating a driverless vehicle.

The solution further comprises a computer program product, which comprises a computer-readable storage medium, on which a program is stored, which, after it was loaded into the memory of the computer, makes it possible for a computer to carry out an above-described method for classifying objects and/or for the distance measurement, optionally together with an above-described device.

The solution moreover relates to a computer-readable storage medium, on which a program is stored, which, after it was loaded into the memory of the computer, makes it possible for a computer to carry out an above-described method for classifying objects and/or for the distance measurement, optionally together with an above-described device.

BRIEF DESCRIPTION OF THE DRAWINGS

In the following, the method is explained in detail again using several figures.

DETAILED DESCRIPTION OF THE PREFERRED EMBODIMENTS

Figure 1:
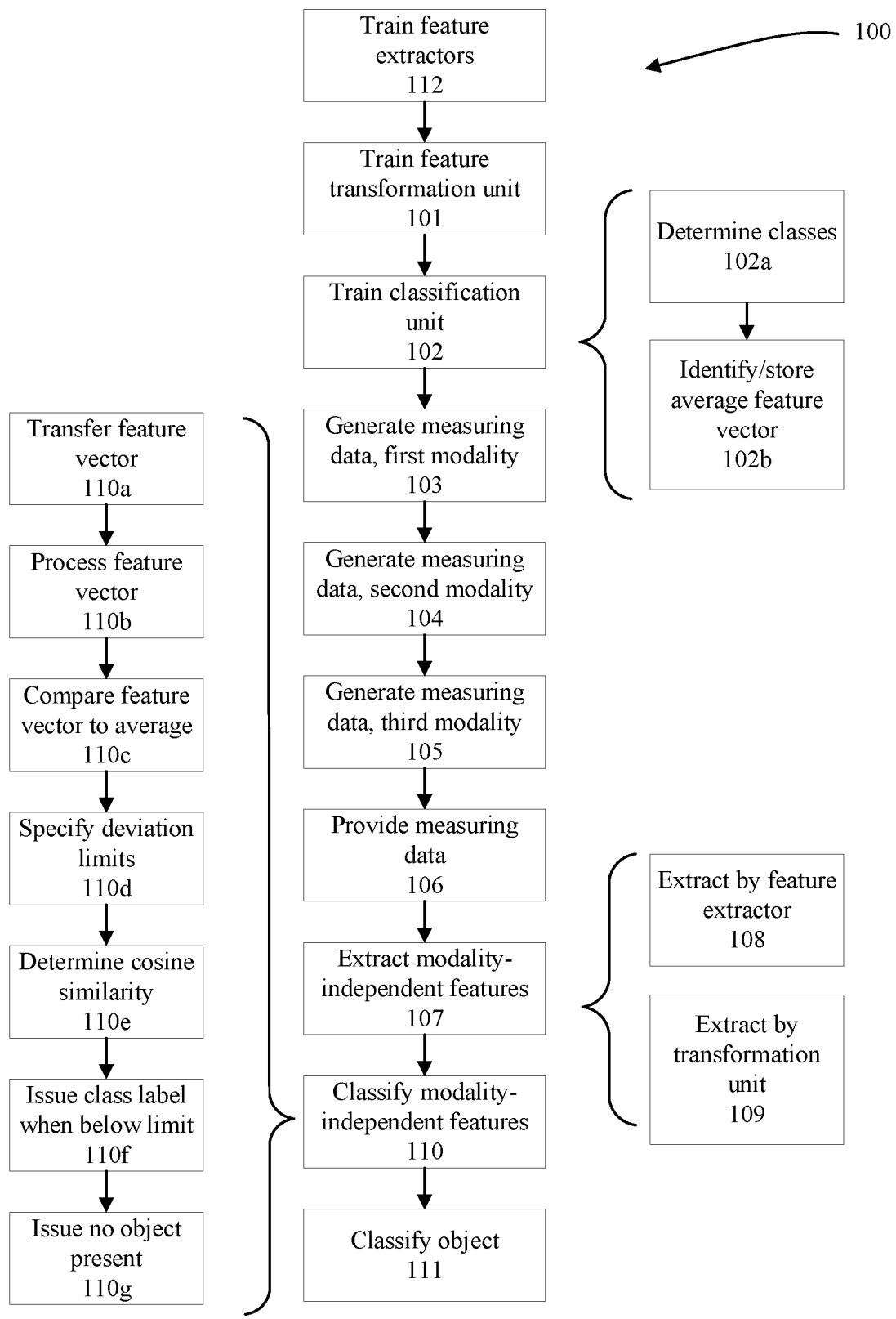
FIG. 1 shows a process diagram of a method according to the disclosure.

A process diagram of a method (100) according to the disclosure is illustrated in FIG. 1.

The method (100) according to the disclosure can preferably comprise the previous training (112) of the feature extractors and the previous training (101) of a feature transformation unit (17) of a feature extraction unit (13).

Further preferably, the method (100) according to the solution can comprise the previous training (102) of a classification unit (18).

The training (102) of the classification unit (18) can especially comprise the determination (102a) of classes, in particular based on the at least one data set, which was provided to the classification unit (18) for training purposes. The classes are determined, for which the classification unit (18) is to assign so-called class labels, after the training has been concluded. The training (102) can further comprise the identification (102b) and storing of an average feature vector for each class.

The method comprises in particular the provision (106) of measuring data for the feature extraction unit. In particular, the method can comprise the generation (103) of measuring data from a sensor of a first sensor modality beforehand, more preferably likewise the generation (104) of measuring data from a sensor of a second sensor modality and/or the generation (105) of measuring data from a sensor of a third sensor modality. Steps 103 to 105 can preferably be performed simultaneously. The method in particular comprises the performance of scans, wherein measuring data of all sensor modalities is available after a scan has been concluded, and can be provided for the feature extraction unit (13).

The method further comprises the extraction (107) of modality-independent features. For this purpose, features are preferably extracted (108) by means of a respective feature extractor. Modality-independent features are extracted (109) from the features of at least two feature extractors by means of the feature transformation unit (17). The method can further comprise the classification (110) of the modality-independent features by means of the classification unit (18), so that an object classification (111) can be carried out.

The classification (110) can comprise that at least one feature vector is transferred (110a) from the feature extraction unit (13) to the classification unit (18), wherein the classification unit (18) preferably processes (110b) the feature vector. As a result, a bottle neck vector is preferably received. The feature vector, the received or preferably the revised one, is in each case compared (110c) to the previously determined average feature vectors. For comparison purposes, deviation limits to the average feature vectors can further be specified (110d). The respective cosine similarity between the feature vector and the average feature vectors is preferably determined (110e). When falling below one of the previously specified deviation limits, in particular the issuance (110f) of the corresponding class label takes place, while, when all of the previously specified deviation limits are exceeded, the issuance (110g) takes place that no object of the classes was detected. This takes place especially by means of a decision module (18a) of the classification unit (18).

Figure 2:
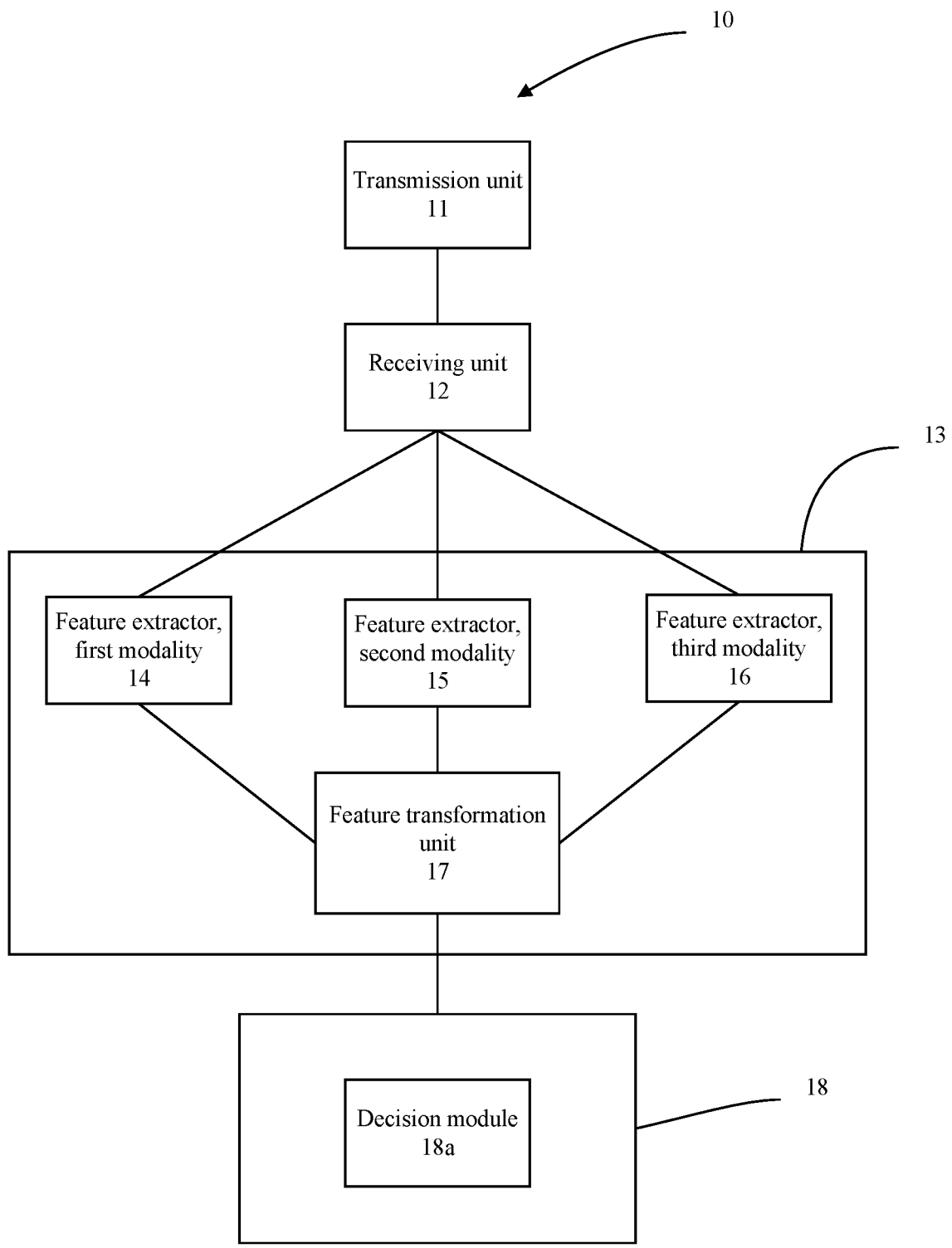
FIG. 2 shows a device according to the disclosure.

FIG. 2 shows a schematic view of a device (10) according to the disclosure. The device (10) comprises a transmission unit (11) and a receiving unit (12). In particular, the receiving unit (12) in each case comprises at least one sensor for each sensor modality, wherein the transmission unit (11) can in each case have the corresponding transmission modules for generating the measuring data for transmitting the signals for generating the measuring data of the respective sensor modality. For example, the transmitting unit (11) can in each case have a source for transmitting lidar and radar measuring data.

The measuring data received in the receiving unit (12) is provided in the feature extraction unit (13). The feature extraction unit (13) comprises a feature extractor (14) for measuring data from the sensor of the first sensor modality, a feature extractor (15) for measuring data from the sensor of the second sensor modality, and a feature extractor (16) for measuring data from the sensor of the third sensor modality. The respective feature extractors (14, 15, 16) extract features, which are provided to the feature transformation unit (17), which generates modality-independent features therefrom. The device further has a classification unit (18), which classifies the modality-independent features of the feature transformation unit (17). The classification unit (18) comprises a decision module (18a).

Figure 3:
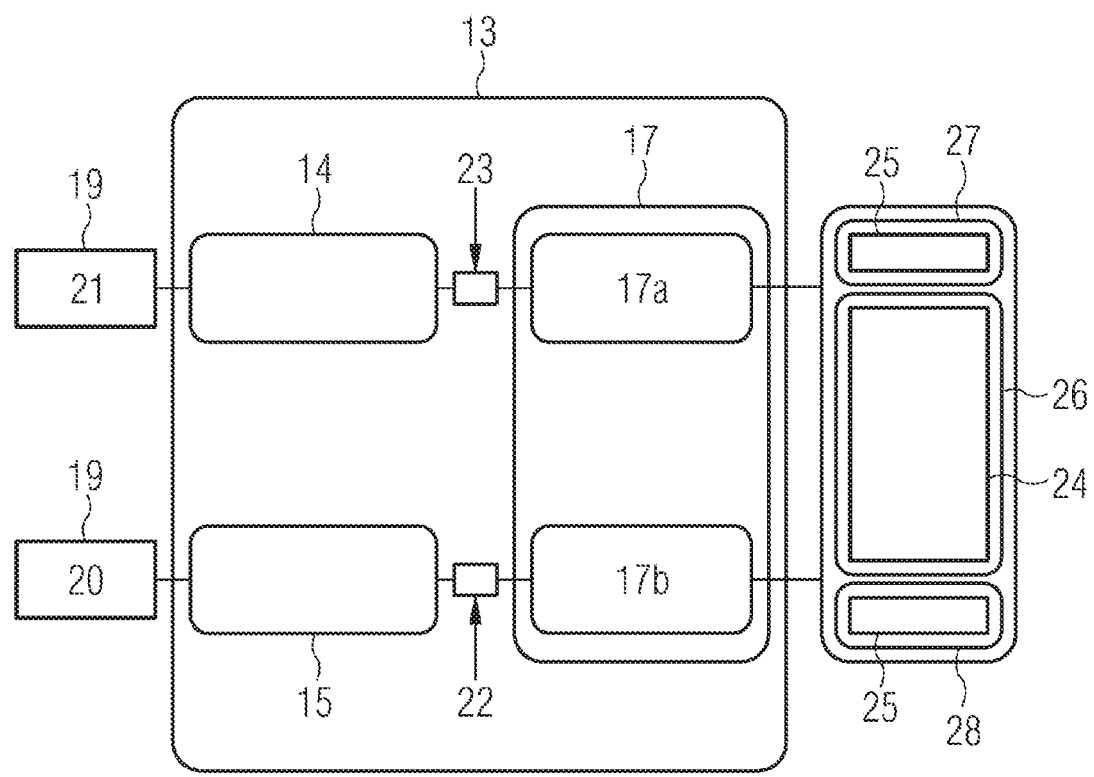
FIG. 3 shows a schematic illustration of a feature extraction unit.

A schematic illustration of a feature extraction unit (13) is shown in FIG. 3. The feature extraction unit (13) comprises a feature extractor (14) for measuring data from the sensor of the first sensor modality, and a feature extractor (15) for measuring data from the sensor of the second sensor modality.

The feature extractors receive modality-dependent input (19). The feature extractor (14) for the measuring data of the first sensor modality is configured to generate a point cloud code (23) from measuring data of the first sensor modality, namely from a lidar point cloud (21). The feature extractor (15) for the measuring data of the second sensor modality is configured to generate an image code (22) from measuring data of the second sensor modality, namely from image data (20).

The feature extraction unit (13) further comprises a feature transformation unit (17). The feature transformation unit (17) comprises a neural network (17a) for the measuring data of the first sensor modality, and a neural network (17b) for the measuring data of the second sensor modality. As input, they receive the respective code of the feature extractors.

The feature transformation unit (17) is configured to detect modality-independent features (24). They live in a common feature space (26). The feature transformation unit (17) can further issue modality-dependent features (25), which live in their own feature spaces, namely in a feature space (27) for modality-dependent features of the first sensor modality, and a feature space (28) for modality-dependent features of the second sensor modality.

Figure 4:
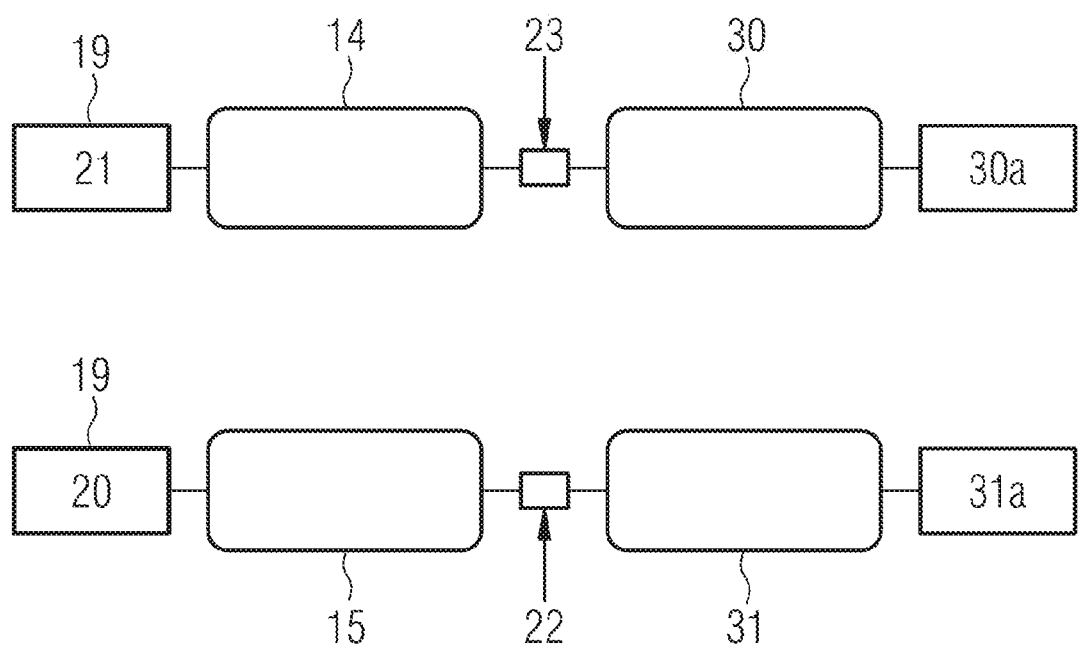
FIG. 4 shows feature extractors and decoders for the first and the second sensor modality for training the feature extractors.

In FIG. 4 a feature extractor (14) and decoder (30) for the first sensor modality, and a feature extractor (15) and a decoder (31) for the second sensor modality for training the feature extractors is shown. The decoder (30) for the first sensor modality issues an output (30a), namely a point cloud, which is compared to the modality-dependent input (19) of the feature extractor (14) for training the feature extractor (14). The decoder (31) for the second sensor modality issues an output (31a), namely image data, which is compared to the modality-dependent input (19) of the feature extractor (15) for training the feature extractor (15).

Figure 5:
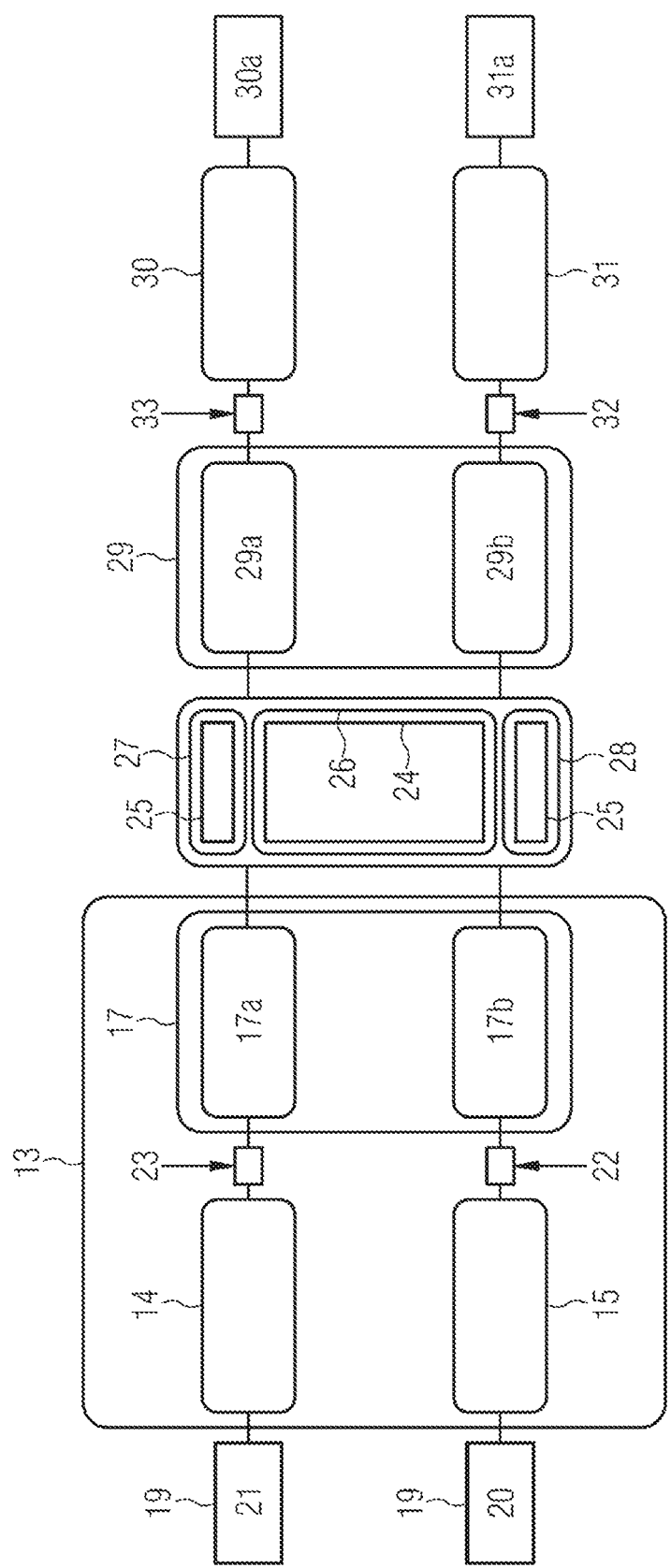
FIG. 5 shows an assembly for training the feature transformation unit comprising a feature extraction unit, a feature retransformation unit, and decoders for training the feature transformation unit.

FIG. 5 displays an assembly for training the feature transformation unit (17), comprising a feature extraction unit (13) according to FIG. 3, a feature retransformation unit (29) and decoders, namely a decoder (30) for the first sensor modality, and a decoder (31) for the second sensor modality. The feature retransformation unit (29) comprises a neural network (29a) for the first sensor modality, and a neural network (29b) for the second sensor modality. As input, they receive the modality-independent features (24), and optionally the modality-dependent features (25) of the feature transformation unit (17).

The feature retransformation unit (29) is configured to generate code from the input again, namely an image code (32) and a point cloud code (33). The respective decoders can generate modality-dependent data from the corresponding codes again. The decoder (31) for the second sensor modality generates an output (31a), which corresponds to regenerated image data. The decoder (30) for the first sensor modality generates an output (30a), which corresponds to a regenerated lidar point cloud.

To train the feature transformation unit (17), the similarity of the modality-independent features (24) as well as a similarity of the regenerated codes as well as of the regenerated modality-dependent data is considered.

EXAMPLES

The feature extractor for the second sensor modality can be set up as follows:
input←image (batch size×192×256×3)
layer 1: convolution layer
    kernel size: 3×3
    stride: 1×1
    number of output feature maps: 16
    activation function: rectified linear unit (ReLU)
    batch normalization
    padding: zero padding
layer 2: convolution layer
    kernel size: 3×3
    stride: 1×1
    number of output feature maps: 16
    activation function: ReLU
    batch normalization
    padding: zero-padding
layer 3: convolution layer
    kernel size: 3×3
    stride: 2×2
    number of output feature maps: 32
    activation function: ReLU
    batch normalization
    padding: zero padding
layer 4: convolution layer
    kernel size: 3×3
    stride: 1×1
    number of output feature maps: 32
    activation function: ReLU
    batch normalization
    padding: zero padding
layer 5: convolution layer
    kernel size: 3×3
    stride: 1×1
    number of output feature maps: 32
    activation function: ReLU
    batch normalization
    padding: zero padding
layer 6: convolution layer
    kernel size: 3×3
    stride: 2×2
    number of output feature maps: 64
    activation function: ReLU
    batch normalization
    padding: zero padding
layer 7: convolution layer
    kernel size: 3×3
    stride: 1×1
    number of output feature maps: 64
    activation function: ReLU
    batch normalization
    padding: zero padding
layer 8: convolution layer
    kernel size: 3×3
    stride: 1×1
    number of output feature maps: 64
    activation function: ReLU
    batch normalization
    padding: zero padding
layer 9: convolution layer
    kernel size: 3×3
    stride: 2×2
    number of output feature maps: 128
    activation function: ReLU
    batch normalization
    padding: zero padding
layer 10: convolution layer
    kernel size: 3×3
    stride: 1×1
    number of output feature maps: 128
    activation function: ReLU
    batch normalization
    padding: Zero-padding
layer 11: convolution layer
    kernel size: 3×3
    stride: 1×1
    number of output feature maps: 128
    activation function: ReLU
    batch normalization
    padding: zero padding
layer 12: convolution layer
    kernel size: 5×5
    stride: 2×2
    number of output feature maps: 256
    activation function: ReLU
    batch normalization
    padding: zero padding
layer 13: convolution layer
    kernel size: 3×3
    stride: 1×1
    number of output feature maps: 256
    activation function: ReLU
    batch normalization
    padding: zero padding
layer 14: convolution layer
    kernel size: 3×3
    stride: 1×1
    number of output feature maps: 256
    activation function: ReLU
    batch normalization
    padding: zero padding
layer 15: convolution layer
    kernel size: 5×5
    stride: 2×2
    number of output feature maps: 512
    activation function: ReLU
    batch normalization
    padding: zero padding
layer 16: convolution layer
    kernel size: 3×3
    stride: 1×1
    number of output feature maps: 512
    activation function: ReLU
    batch normalization
    padding: zero padding
layer 17: convolution layer
    kernel size: 3×3
    stride: 1×1
    number of output feature maps: 256 activation function: ReLU
batch normalization
padding: zero padding
layer 18: convolution layer
  kernel size: 3×3
  stride: 1×1
  number of output feature maps: 256
  activation function: ReLU
  batch normalization
  padding: zero padding
layer 19: convolution layer
  kernel size: 5×5
  stride: 2×2
  number of output feature maps: 128
  activation function: none
  batch normalization
  padding: zero padding
output: batch size×code (=batch size×1536)
A corresponding decoder for training the feature extractor can be set up as follows:
input←batch size×code
layer 1: reshape into batch size×3×4×128
layer 2: 'transposed convolution'=learned upsampling
  kernel size: 5×5
  padding: zero padding
  stride: 2×2
  feature maps: 256
  activation function: ReLU
layer 3: convolution
  kernel size: 3×3
  padding: zero padding
  stride: 1×1
  feature maps: 256
  activation function: ReLU
layer 4: convolution
  kernel size: 3×3
  padding: zero padding
  stride: 1×1
  feature maps: 512
  activation function: ReLU
layer 5: 'transposed convolution'
  kernel size: 5×5
  padding: zero padding
  stride: 2×2
  feature maps: 512
  activation function: ReLU
layer 6: convolution
  kernel size: 3×3
  padding: zero padding
  stride: 1×1
  feature maps: 256
  activation function: ReLU
layer 7: convolution
  kernel size: 3×3
  padding: zero padding
  stride: 1×1
  feature maps: 256
  activation function: ReLU
layer 8: 'transposed convolution'
  kernel size: 5×5
  padding: zero padding
  stride: 2×2
  feature maps: 256
  activation function: ReLU
layer 9: convolution
  kernel size: 3×3
  padding: zero padding
  stride: 1×1
  feature maps: 128
  activation function: ReLU
layer 10: 'transposed convolution'
  kernel size: 5×5
  padding: zero padding
  stride: 2×2
  feature maps: 128
  activation function: ReLU
layer 11: convolution
  kernel size: 3×3
  padding: zero padding
  stride: 1×1
  feature maps: 64
  activation function: ReLU
layer 12: 'transposed convolution'
  kernel size: 5×5
  padding: zero padding
  stride: 2×2
  feature maps: 64
  activation function: ReLU
layer 13: convolution
  kernel size: 3×3
  padding: zero padding
  stride: 1×1
  feature maps: 32
  activation function: ReLU
layer 14: 'transposed convolution'
  kernel size: 3×3
  padding: zero padding
  stride: 2×2
  feature maps: 32
  activation function: ReLU
layer 15: convolution
  kernel size: 3×3
  padding: zero padding
  stride: 1×1
  feature maps: 1
  activation function: none
output: batch size×192×256×1 (=gray scale value image of the input image)

The term "transposed convolution" is thereby not to be understood as a transposition of a matrix in the mathematical sense, but an upsampling is trained. In other words, a 'zooming" to original image size is trained.

The training of the feature extractor and of the decoder can be determined by the following parameters:
optimizer: AdamOptimizer
learning rate: 0.0001
  exponential decay: staircase
    The learning rate decreases like a step function. After 200000 steps, it decreases by half, until it has reached a minimum of 0.00001, after which it remains constant
batch size: 32
initialization of all variables: Xavier initialization
loss function: mean squared error
total epochs to learn: 550

The feature extractor for the first sensor modality can be set up as follows:
input←batch size×2048×3
layer 0:
  layer 0.1: multi layer perceptrons (MLP)
    number of functions: 64
    kernel 1×3
    batch normalization
    activation function: ReLU layer 0.2: MLPs
  number of functions: 128
  kernel 1×1
  batch normalization
  activation function: ReLU
layer 0.3: MLPs
  number of functions: 1024
  kernel 1×1
  batch normalization
  activation function: ReLU
layer 0.4: fully connected
  output: 512
  batch normalization
  activation function: ReLU
layer 0.5: fully connected
  output: 256
  batch normalization
  activation function: ReLU
layer 0.6: fully connected
  output: 9
  no activation function
  initialization of the variables with 0
layer 0.7: addition with unit matrix [1 0 0 0 1 0 0 0 1]
  output: batch size×3×3
layer 1: input*output layer 0
layer 2: MLPs
  number of functions: 64
  kernel 1×3
  batch normalization
  activation function: ReLU
layer 3: MLPs
  number of functions: 64
  kernel 1×1
  batch normalization
  activation function: ReLU
layer 4: learning of matrix for multiplication
  layer 4.1: MLP
    number of functions: 64
    kernel 1×1
    batch normalization
    activation function: ReLU
  layer 4.2: MLPs
    number of functions: 128
    kernel 1×1
    batch normalization
    activation function: ReLU
  layer 4.3: MLPs
    number of functions: 1024
    kernel 1×1
    batch normalization
    activation function: ReLU
  layer 4.4: fully connected
    output: 512
    batch normalization
    activation function: ReLU
  layer 4.5: fully connected
    output: 256
    batch normalization
    activation function: ReLU
  layer 4.6: fully connected
    output: 4096
    no activation function
    initialization of the variables with 0
  layer 4.7: addition with unity matrix (size 64)
  output: batch size×64×64
layer 5: layer 3*output layer 4
layer 6: MLPs
  number of functions: 64
  kernel 1×1
  batch normalization
  activation function: ReLU
layer 7: MLPs
  number of functions: 128
  kernel 1×1
  batch normalization
  activation function: ReLU
layer 8: MLPs
  number of functions: 1536
  kernel 1×1
  batch normalization
  activation function: ReLU
output: batch size×code (=1536)
The decoder for the first sensor modality can be set up as follows:
input←batch size×code
layer 1: fully connected
  output: 2048
  activation function: ReLU
layer 2: dropout
  dropout rate: 0.2
layer 3: fully connected
  output: 2048
  activation function: ReLU
layer 4: dropout
  dropout rate: 0.2
layer 5: fully connected
  output: 6144 (=2048*3)
  activation function: none
output: batch size×2048×3 (=same size of the input point cloud)
The training of the feature extractor and of the decoder for the first sensor modality can be determined by the following parameters:
optimizer: AdamOptimizer
learning rate: 0.0001
  exponential decay: staircase
    The learning rate decreases like a step function. After 200000 steps, it decreases by half, until it has reached a minimum of 0.00001, after which it remains constant
batch size: 32
initialization of all variables (except for initialization with 0): Xavier initialization
loss function: Chamfer distance between the input point cloud and generated output point cloud of the decoder
total epochs to learn: 550
All of the networks of the feature transformation unit can be set up as follows:
input←batch size×code (=either image code or point cloud code)=batch size×1536
layer 1: fully connected
  output: 2048
  activation function: ReLU
layer 2: dropout
  dropout rate: 0.2
layer 3: fully connected
  output: 1400
  activation function: ReLU
layer 4: dropout
  dropout rate: 0.2 layer 5: fully connected:
  output: 1400
  activation function: none
output: code batch size×1400
  code for modality-specified features: batch size×[0: 700]
  code for common features: batch size×[700:1400]
All of the networks of the feature retransformation unit can be set up as follows:
optional: I_spec=input code for modality-specific features
I_common=code for common features
optional: I_spec:
  layer.1: fully connected (input modality-specific)
    output: 512
    activation function: ReLU
  layer 2: dropout
    dropout rate: 0.2
  layer 3: fully connected
    output: 1024
    activation function: ReLU
  layer 4: dropout
    dropout rate: 0.2
  layer 5: fully connected:
    output: 1536
    activation function: none
  output modality-specific features: batch size×1536
I_common:
  layer.1: fully connected (input common features)
    output: 512
    activation function: ReLU
  layer 2: dropout
    dropout rate: 0.2
  layer 3: fully connected
    output: 1024
    activation function: ReLU
  layer 4: dropout
    dropout rate: 0.2
  layer 5: fully connected:
    output: 1536
    activation function: none
  output common features: batch size×1536
output=output common features+optional output-specific features
The training of the feature transformation unit can be determined by the following parameters:
optimizer: AdamOptimizer
learning rate: 0.001
  exponential decay: staircase
    The learning rate decreases like a step function. After 200000 steps, it decreases by the factor 0.3, until it has reached a minimum of 0.00001, then it remains constant
batch size: 32
initialization of all variables: Xavier initialization
total epochs to learn: 400
loss function:
  loss on the first 200 epochs
    1) cosine similarity of the common features of both modalities
    2) mean squared error between 'real image code' and retransformed image code
    3) mean squared error between 'real point cloud code' and retransformed point cloud code
    LOSS=1)+2)+3)
  loss on the last 200 epochs
    1) cosine similarity of the common features of both modalities
    2) mean squared error between 'real image data' and generated image data
    3) Chamfer distance between 'real point cloud' and generated point cloud
    LOSS=1)+2)+3)
The neural network of the classification unit can be set up as follows:
layer 1: fully connected
  output: 1024
  activation function: ReLU
layer 2: fully connected
  output: 1024
  activation function: ReLU
layer 3: fully connected
  output: 2048
  activation function: ReLU
layer 3: fully connected=bottle neck vector
  output: #number of classes to be classified
  activation function: none
  The average value of the individual classes is stored by this vector and is used as comparison
The training of the classification unit can be determined by the following parameters:
Loss function: Softmax Cross Entropy
optimizer: AdamOptimizer
learning rate: 0.01
  exponential decay: the learning rate decreases like a step function. After 200000 steps, it shrinks by the factor 0.7, until it has reached a minimum of 0.00001, then it remains constant.
batch size: 32
initialization of all variables: Xavier initialization
total epochs to learn: 50

What is claimed is:

1. A method for classifying objects, wherein the method comprises:
a provision of measuring data from a sensor for a feature extraction unit,
extraction of modality-independent features from the measuring data,
wherein the modality-independent features are independent of a sensor modality of the sensor, so that a conclusion to the sensor modality of the sensor is not possible from the modality-independent features,
wherein the extraction of modality-independent features from the measuring data comprises:
extracting features from the measuring data using the feature extractor unit comprising at least one feature extractor for each sensor modality,
transforming the features for each modality using a neural network of the feature extraction unit, and extracting by a feature transformation unit, the modality-independent features from the features of at least two feature extractors.

2. The method according to claim 1,
wherein there is at least a first sensor modality and a second sensor modality,
wherein the method is configured to extract the modality-independent features from the measuring data from a sensor of the first sensor modality in such a way that measuring data from a sensor of the second measuring modality can be reconstructed.

3. The method according to claim 1,
wherein the feature extractor is a neural network.

4. The method according to claim 1,
wherein the first sensor modality is lidar, and
wherein the feature extractor of the first sensor modality is a multi layer perceptron (MLP) network.

5. The method according to claim 1,
wherein the second sensor modality is an image, and
wherein the feature extractor of the second sensor modality is a convolutional neural network.

6. The method according to claim 1,
wherein the method comprises previous training of the feature extraction unit by means of unmonitored learning.

7. The method according to claim 1,
wherein the method comprises classification of the modality-independent features by means of a classification unit.

8. The method according to claim 7,
wherein the method comprises previous training of the classification unit by means of monitored learning.

9. The method according to claim 7,
wherein the method comprises
transferring of at least one feature vector from the feature extraction unit to the classification unit,
wherein the classification comprises comparison of the received feature vector to a respective previously determined average feature vector for each class, and
issuing a corresponding class label when falling below a previously specified deviation limit.

10. A device for carrying out a method for classifying objects which comprises:
provision of measuring data from a sensor for a feature extraction unit and extraction of modality-independent features from the measuring data,
wherein the modality-independent features are independent of a sensor modality of the sensor, so that a conclusion to the sensor modality of the sensor is not possible from the modality-independent features,
wherein the feature extraction unit comprises at least one feature extractor for each sensor modality,
wherein the feature extractor extracts features from the measuring data,
wherein the feature extraction unit comprises a feature transformation unit,
wherein the feature transformation unit comprises a neural network for each sensor modality, and wherein the feature transformation unit extracts the modality-independent features from the features of at least two feature extractors.

11. A non-transitory computer-readable storage medium on which a program is stored, which when executed by a computer carries out a method for classifying objects, said method comprises:
a provision of measuring data from a sensor for a feature extraction unit, and
extraction of modality-independent features from the measuring data,
wherein the modality-independent features are independent of a sensor modality of the sensor, so that a conclusion to the sensor modality of the sensor is not possible from the modality-independent features,
wherein the extraction of modality-independent features from the measuring data comprises:
extracting features from the measuring data using the feature extractor unit comprising at least one feature extractor for each sensor modality,
transforming the features for each sensor modality using a neural network of the feature extraction unit, and
extracting by a feature transformation unit, the modality-independent features from the features of at least two feature extractors.

* * * * *